May 7, 1957 G. M. GROENENDYKE 2,791,694

POLYPHASE OSCILLATOR INDEPENDENTLY VARIABLE IN FREQUENCY AND PHASE

Filed Aug. 27, 1954 2 Sheets-Sheet 1

GOETHE M. GROENENDYKE

INVENTOR.

BY D. Carl Richards

ATTORNEY.

GOETHE M. GROENENDYKE
INVENTOR.

BY D. Carl Richards
ATTORNEY 2,791,694

POLYPHASE OSCILLATOR INDEPENDENTLY VARIABLE IN FREQUENCY AND PHASE

Goethe M. Groenendyke, Dallas, Tex., assignor, by mesne assignments, to Socony Mobil Oil Company, Inc., a corporation of New York Application August 27, 1954, Serial No. 452,617

13 Claims. (Cl. 250—36)

This invention relates to a source of alternating current variable in phase and variable in frequency independent of phase. In another aspect, the invention relates to a multiphase signal source.

Generation of a plurality of signals stable in frequency and having uniform character over a substantial frequency range adds to the problems generally encountered in oscillators, the problems arising primarily because of the necessity in many instances to attain synchronized operation.

Prior multiple signal sources, in general, have comprised single loop circuits. In accordance with the present invention, there is provided a polyphase oscillator network having a plurality of loops, the signal in each loop being of a different phase than the signal in any other loop.

More particularly, in accordance with the present invention there is provided an oscillator system which includes a plurality of amplifier networks each having an input circuit and an output circuit and characterized by a gain less than unity. A loop of impedances connected in series comprising a like number of resistive elements separated one from the other by a like number of capacitive elements is provided as a common link to the three amplifiers. Connections are provided between each amplifier output circuit and each amplifier input circuit to the loop at opposed points on the loop, the connections being such that any point on the loop is singularly associated with only one of the plurality of amplifiers.

In a more specific aspect, the oscillator system comprises in a preferred form a system such as above described in which a second link is provided as to be common to all amplifiers. The second link may be characterized as a cathode bias impedance common to a selected cathode in each of the amplifier networks.

The resistive and capacitive elements series-connected form an oscillatory control loop. Further in accordance with the present invention, potentiometer means are connected to the output circuits of the amplifiers so that the voltage from such potentiometer may be varied in phase relative to the output of any given amplifier independently of frequency. Further, the oscillatory loop is variable so that frequency of oscillation may be varied independently of the phase of the signal from the potentiometer means.

For a further understanding of the present invention and for a more complete description thereof, reference may now be had to the following description taken in conjunction with the accompanying drawings in which:

Fig. 1 diagrammatically represents an oscillator-potentiometric system;

Figures 1, 2:
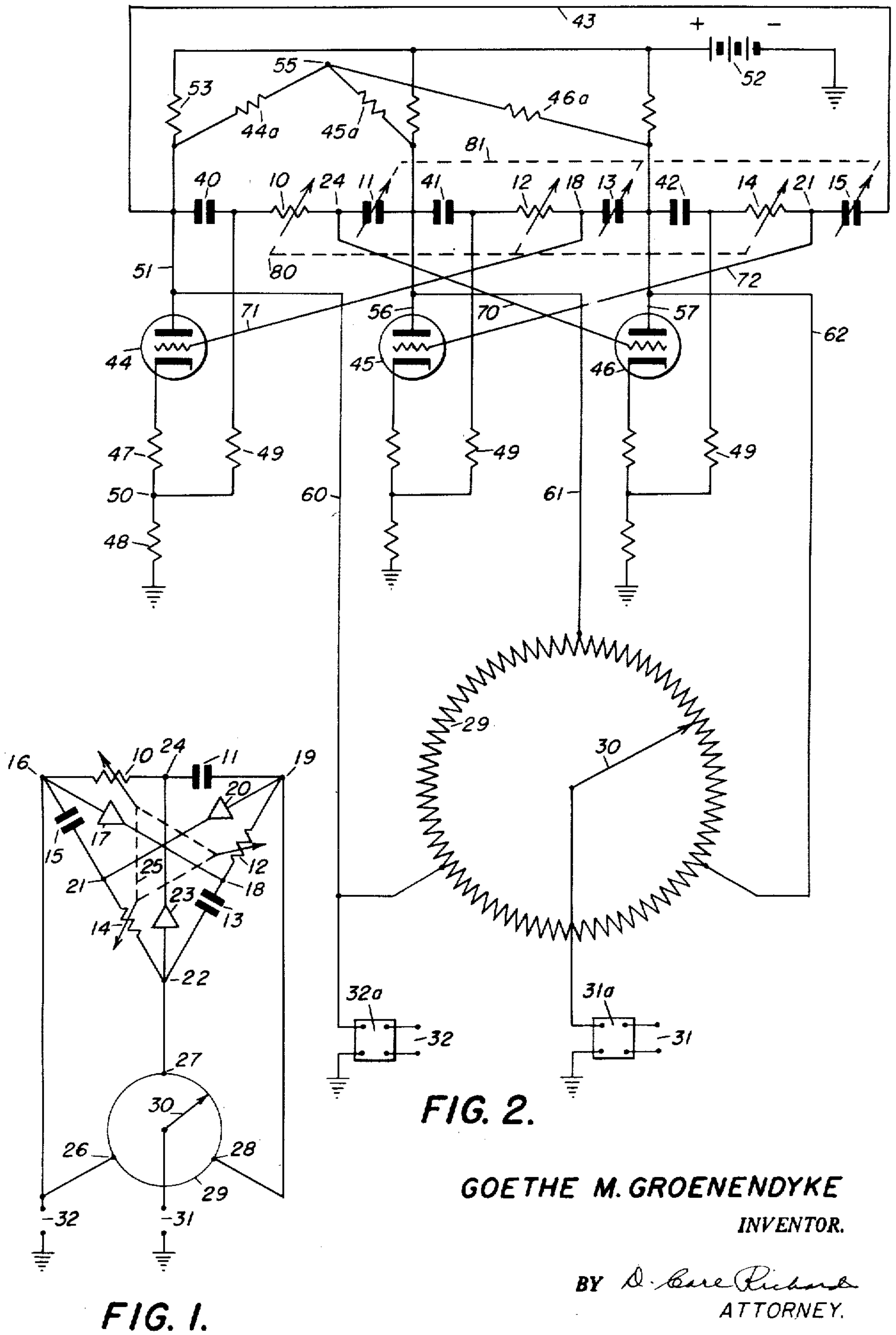
Fig. 2 is a detail circuit diagram of the system of Fig. 1.

Referring now to Fig. 1, there are disclosed three phase shifting networks connected to form a delta. A first phase shifting network comprises resistance 10, condenser 11. The second phase shifting network comprises resistance 12, condenser 13, while the third such network comprises resistance 14 and condenser 15. Thus elements 10–15 form a closed phase shifting loop. The apex 16 of the delta is connected to the output of an amplifier 17 whose input is connected to the juncture 18 between resistance 12 and condenser 13. Similarly, the apex 19 is connected to the output of an amplifier 20 which is connected at its input to the juncture 21 between elements 14 and 15. The apex 22 is connected to the output of amplifier 23 whose input is connected to juncture 24 between elements 10 and 11.

The amplifiers 17, 20 and 23 cross-connect selected points in the phase shifting loop to form a plurality of subloops in order to sustain oscillation in the main loop. It is to be noted that elements 10, 12 and 14 are variable and are connected together as indicated by the dotted line 25 simultaneously to vary elements 10, 12 and 14 to change the frequency of oscillation in the main loop. Elements 10, 12 and 14 preferably are identical and elements 11, 13 and 15 similarly are identical in which case the voltages at points 16, 19 and 22 are identical in magnitude and form, are of common frequency but are spaced one from the other in phase by equal angles. In the system shown in Fig. 1 the voltages at points 16, 19 and 22 are spaced 120° one from the other, thereby constituting a three-phase voltage source. The voltages at points 16, 19 and 22 may be utilized in applications where three-phase signals at a common frequency are required and where it is required simultaneously to vary frequency thereof.

Further and in accordance with the present invention, three-phase voltages are connected to a variable impedance such as to spaced points 26, 27, 28 around the periphery of a potentiometer 29 which is provided with a variable tap or slider 30. Potentiometer 29 may be in the form of a continuous resistance loop and is so adapted that slider 30 may sweep continuously the entire potentiometer element. The voltage between slider 30 and ground, appearing at terminals 31, may thus have any phase angle between zero and $2\pi$ radians relative to the reference voltage betwen point 16 and ground appearing at terminals 32. Thus there is provided a signal of variable phase and in which the phase angle is independent of frequency. The coupling 25 may be actuated to vary the frequency of oscillation in the main oscillator loop whereby the frequency of signals applied to the potentiometer 29 will vary, but for a given setting of tap 30 the phase of the signal at terminals 31 will remain unchanged relative to the phase of signals at terminal 32 regardless of the frequency of oscillation in the main loop.

Referring now to Fig. 2, the oscillator circuit, together with the continuous potentiometer, has been shown in detail. Where consistent, like parts have been given the same reference character as in Fig. 1. For example, the main loop includes the resistors 10, 12 and 14 and condensers 11, 13 and 15. Isolating condensers 40, 41 and 42 are connected between each pair of phase shifting networks. Conductor 43 completes the loop.

The amplifier system includes the tubes 44, 45 and 46. The circuits for the tubes are identical. For example, the cathode of tube 44 is connected by way of resistors 47 and 48 to ground. The juncture between resistor 10 and isolating condenser 40 is connected by way of resistor 49 to the juncture 50 between resistors 47 and 48. The output of tube 44 is coupled to the main loop by way of conductor 51. Tube 44 is further connected to a source of anode potential 52 by way of a load resistor 53. Similarly, the output of tube 45 is connected to the main loop by way of conductor 56, and the output of tube 46 is connected to the main loop by way of conductor 57.

The signal at the anode of tube 44 is connected by way of conductor 60 to a selected point on the continuous potentiometer 29 and, by way of an isolating network 32*a*, to the output terminals 32. The anode of tube 45 similarly is connected to potentiometer 29 by way of conductor 61, and the anode of tube 46 is connected to potentiometer 29 by way of conductor 62. Potentiometer 29 preferably is provided with uniform windings and the points of connection for conductors 60, 61 and 62 preferably are spaced equilaterally around the periphery thereof. The slider 30 is connected by way of isolating network 31*a* to output terminals 31.

Three subloops are formed by cross-connecting the outputs of tubes 44–46 to the grids thereof.

More particularly, juncture 24 is connected to the control grid of tubes 46 by way of conductor 70. Similarly, juncture 18 is connected to the control grid of tubes 44 by conductor 71. Juncture 21 is connected to the grid of tube 45 by way of conductor 72. By this means, phase shifted signals are fed back to control grids in the main loop to sustain oscillation in the main loop. Phase relationships of precisely 120° may be assured if resistors 10, 12 and 14 are identical and if condensers 11, 13 and 15 are identical.

Figure 3:
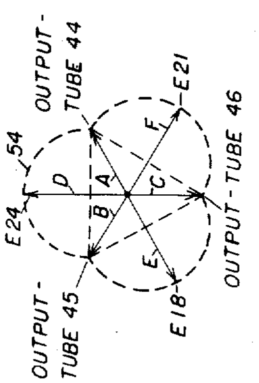
Fig. 3 is a vector diagram of operation of Fig. 2.

Operation of the present invention involves the requirement in the present circuit that the net gain per stage must be less than unity, whereas in conventional oscillators gains greater than unity are required. More particularly, as shown in the vector diagram of Fig. 3, the voltages at the anodes of tubes 44, 45 and 46 have been represented by the vectors A, B and C, respectively. The voltage $E_{24}$ on the grid of tube 46 is the vector sum of the voltages at the anodes of tubes 44 and 45. The locus of the resultant vector, i. e. vector D which is the voltage at point 24, is the dotted arc 54. This voltage is applied to the grid of tube 46 whose output is represented by vector C which is smaller than vector D. Thus it is required that there be a loss in each stage of amplification and, more particularly, the output of each stage must be equal to .732 times the input. Fig. 3 illustrates the foregoing relationships in geometrical form where in addition to vector D vectors E and F represent the input voltage applied to the grids of tubes 44 and 45, respectively. Resistors 49, Fig. 2, providing feedback for each stage, are designed to provide the required loss per stage.

The level of oscillation of the system may be controlled in a conventional manner such as, for example, coupling the anodes of tubes 44, 45 and 46 as through non-linear impedances 44*a*, 45*a* and 46*a* to a common point 55. Impedances 44*a*, 45*a* and 46*a* may be of the type commonly known in the art as thermisters and have characteristics such that the impedance decreases as the voltage thereacross is increased. Alternatively, amplitude stability may be provided by placing an impedance, such as a tungsten filament, in the cathode circuits 44, 45 and 46 whereupon resistance increases as voltage thereacross increases. The amplitude of oscillation will thus be maintained at a fixed and constant level.

As shown in Fig. 2, resistors 10, 12 and 14 are variable as by actuation of the common link 80. Alternatively, condensers 11, 13 and 15 may be made variable through the common link 81 and thus provide means for readily varying the frequency of oscillation. In operation, either the phase controlling resistors or the phase controlling condensers may be varied simultaneously, stepwise or continuously, to vary the frequency of the signals appearing on conductors 60–62.

Further and in accordance with the invention, the phase angle of the signal appearing at terminals 31 relative to the signal at, for example, terminals 32 may be made independent of frequency, a condition not ordinarily visualized when considering transmission of variable frequency signals through a lumped impedance network. However, by providing a three-phase signal source connected to a resistance delta, the tap or slider 30 on the resistance delta may be set at a given point and the frequency of the signal in the oscillator may be varied at will without changing the phase of the signal at terminals 31 relative to the signal at terminals 32. In this aspect of the invention, a useful tool is provided for the study of phase characteristics of various transmission networks and media providing a tool more readily adaptable to such problems than those requiring the adjustment of frequency to a desired range and then readjustment of phase settings at the beginning of any given series of measurements.

It will be understood that a plurality of loops, other than the three loops shown, generally may thus be organized to form a multiphase oscillator, it being required only that phase shift in the feedback loop relative to a given input be selected as to support oscillation and that an oscillator of three phases is a representative example of this general field of application.

The oscillator system, such as shown in Fig. 1, in one form comprised the following elements which are given by way of example only and are not to be taken by way of limitation:

| | |
|---|---|
| Tubes **44**, **45** and **46** | Type 6C4. |
| Condensers **40**, **41** and **42** | 1 mfd. |
| Resistor **47** | 1,000 ohms. |
| Resistor **48** | 12,000 ohms. |
| Resistor **49** | 1 megohm. |
| Resistor **53** | 27,000 ohms. |
| Battery **52** | 375 volts. |
| Potentiometer **29** | 200,000 ohms. |

Resistors 10, 12, 14 and condensers 11, 13, 15 are selected and made variable over a given range for oscillation at a desired range.

The system shown in Fig. 2 is suitable for operation in certain frequency ranges. However, it will be readily recognized that the use of coupling condensers 40, 41 and 42 will modify the frequency characteristic of the circuit at the lower end of the frequency band. In contrast, Fig. 4 illustrates a direct coupled three-phase oscillator system which does not have the frequency limitations of the system shown in Fig. 2.

Figure 4:
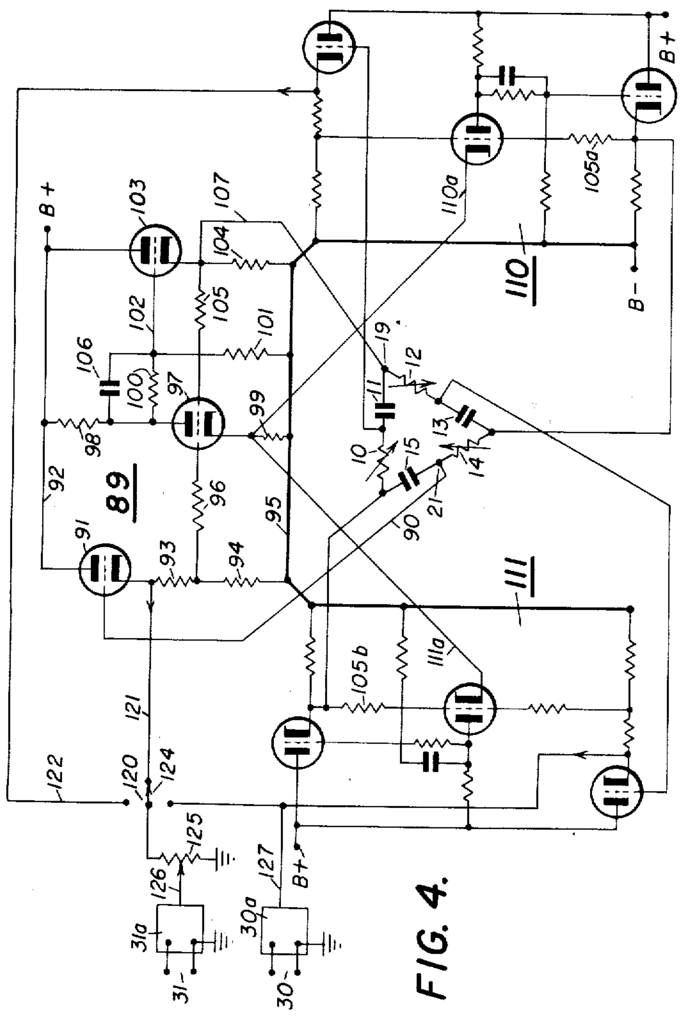
Fig. 4 is a direct coupled oscillator system.

The system of Fig. 4 is designed to operate under the control of a resistance-condenser delta network as in Fig. 1 in which resistors 10, 12 and 14 are interconnected by condensers 11, 13 and 15. Since the three oscillator subloops are identical, one of them the oscillator 89, will be here described in detail and then the joint operation of all three will be discussed. The input to oscillator 89 will comprise the voltage at point 21 intermediate resistor 14 and condenser 15. The output of this stage is applied to the juncture 19 between condenser 11 and resistor 12. Conductor 90 connects point 21 to the control grid of a triode 91. The anode of triode 91 is connected to a B+ bus 92. The cathode is connected through a biasing resistor 93 and a feedback resistor 94 to a B− or ground bus 95. The juncture between cathode resistors 93 and 94 is direct coupled by way of impedance 96 to the control grid of a triode 97. The anode of triode 97 is connected by way of load resistor 98 to B+ bus 92. The cathode of tube 97 is connected by way of resistor 99 to the ground bus 95.

The juncture between cathode resistors 93 and 94 is direct coupled by way of impedance 96 to the control grid of the triode 97. A voltage dividing network comprising resistor 100 and resistor 101 is connected between the anode of tube 97 and ground. The juncture between resistors 100 and 101 is connected by conductor 102 to the grid of a triode 103 whose anode is directly connected to the B+ bus 92. The cathode of tube 103 is connected by way of resistor 104 to the ground bus 95, and by way of feedback resistor 105 to the control grid of triode 97. A very small condenser 106 is connected in parallel with coupling resistor 100.

In operation, the voltage at the cathode of tube 91, at a relatively low impedance, is coupled to the grid of an amplifier tube 97. The output of amplifier 97 is applied through voltage dividing network 100, 101 to the grid of tube 103. The cathode follower output of tube 103 is applied to the main oscillator control loop (impedances 10–15) by way of conductor 107.

Resistors 100 and 101 are selected such that the voltage appearing between conductor 102 and ground bus 95 is smaller than the voltage on conductor 90, thereby satisfying the operational relationships above described in connection with Fig. 3. Preferably the voltage appearing between conductor 102 and ground bus 95 is equal to .732 times the voltage on conductor 90.

It is to be noted that circuit 110 and circuit 111 are identical in construction and operation with the circuit comprising elements 90–107, described immediately above, with the exception that cathode 110*a* of the amplifier tube in circuit 110 and cathode 111*a* of the amplifier tube in circuit 111 are connected to the cathode of tube 97, whereby amplifier currents flow through the common cathode impedance 99. This circuit element is provided to eliminate the undesirable effect that would otherwise be present if a separate cathode impedance were provided for the cathode of tube 97 as well as for the cathodes 110*a* and 111*a*. In the latter case, it would be necessary to by-pass such cathode resistor with a condenser which would undesirably alter the frequency characteristics of the amplifier. However, by coupling all three cathodes to a common resistor such as resistor 99, the A. C. components of the voltages from the three amplifier tubes are equal in amplitude and phased 120° one from the other so that the net A. C. voltage across cathode resistor 99 is zero, thus making unnecessary the inclusion of by-pass condenser elements.

A system constructed as shown in Fig. 4 provides three output signals spaced 120° apart which may be used in connection with a continuous potentiometer such as shown in Fig. 2 or may be used as shown in Fig. 4 and described below. Three output voltages are applied to a switch 120. More particularly, voltage from the cathode of tube 91 ic connected to a first switch terminal by way of conductor 121. An output voltage similarly is derived from circuit 110 and connected to a second switch terminal by way of a second switch conductor 122. A voltage is derived from circuit 111 and connected to a third terminal switch 120 by conductor 123. The armature 124 of switch 120 is connected to one end of a potentiometer 125, the other end of which is connected to ground. The slider or tap 126 of potentiometer 125 is connected to an isolating network 31*a* whose output is connected to an isolating network Conductor 127 connects conductor 123 to a second isolating network 30*a* whose output is connected to output terminals 30. In this modification potentiometer 125 may be of conventional type. The armature 124 of switch 120 may be actuated to select the reference voltage appearing at terminals 30. Since this reference voltage may correspond to any one of vectors A, B or C of Fig. 3, potentiometer 125 may be varied in connection with the switch selective to provide two voltages (terminals 30 and 31) which may have any phase relationship between zero and $2\pi$ radians.

Operation of the system shown in Fig. 4 involves the impedance 105 for stability control. Preferably this impedance is a temperature sensitive resistor such as a thermister which provides negative feedback to stabilize the oscillator system. Similar impedances 105*a* and 105*b* are provided in circuits 110 and 111 for uniformity of system operation. The modification of the invention as shown in Fig. 4 has been found to be preferred in view of its stability and wide operating range. The shunt condensers, such as condenser 106, compensate for slight inductive characteristics of the resistors, such as resistor 100, so that the frequency range is limited by tube characteristics and not by other circuit components.

From the foregoing it will be seen that the oscillator system comprises three amplifiers with at least two links which are common to the three amplifiers. The first such link is the cathode impedance 99 and the connections thereto from the cathodes of the amplifier and from the B— bus. By reason of the common connection, the impedance 99 carries all the cathode-anode current for the three intermediate amplifier stages of the three amplifiers. The second link between the three amplifiers comprises the frequency controlling loop wherein amplifier input circuits and amplifier output circuits are connected to the loop at diametrically opposed points. The junctures between the six frequency controlling impedances provide six connecting points so that any amplifier input or any amplifier output may be singularly connected to a given point on the frequency controlling loop.

Since the system shown in Fig. 4 provides for a greater operating range than that of Fig. 2, it has been found to be the preferred form of the invention wherein, by way of example only, components had the following values:

| | |
|---|---|
| Triodes **91, 97** and **103** | One-half of 12AT7. |
| Bias resistor **93** | 680 ohms |
| Cathode impedance **94** | 15,000 ohms. |
| Coupling resistor **96** | 50,000 ohms. |
| Load impedance **98** | 120,000 ohms. |
| Common cathode impedance **99** | 100,000 ohms. |
| Resistor **100** | 1 megohm. |
| Resistor **101** | 2 megohms |
| Condenser **106** | 10 $\mu\mu$ mfd. |
| Thermistor **105** | Approximately 50,000 ohms under operating conditions. |
| Cathode impedance **104** | 10,000 ohms. |
| B+ source | 350 volts. |

While this invention has been illustrated and described in such detail as to enable one skilled in the art to make and use the same, it is to be understood that modifications may now suggest themselves to those skilled in the art and it is intended to cover such modifications as fall within the scope of the appended claims.

What is claimed is:

1. An oscillator system comprising three direct coupled amplifier networks each having an input circuit of high impedance and an output circuit of low impedance and a gain less than unity, a series loop of lumped impedances comprising three resistive elements and three capacitive elements alternately connected, and at least two links common to said three amplifier networks, the first link comprising a self-biasing impedance connected in the cathode circuits of each of said amplifier networks for flow of cathode current from said three amplifier networks therethrough, and the second link comprising connections to said loop at diametrically opposed points from the input circuit and output circuit of each of said amplifier networks, respectively, wherein the connections to any such point are singularly connected to any given amplifier.

2. In a polyphase oscillator system the combination comprising a plurality of amplifier networks each having an input circuit and an output circuit and a gain less than unity, a series loop of impedances comprising a like number of resistive elements and a like number of capacitive elements alternately connected, and linkages common to said amplifier networks which comprise connections to said loop at opposed points thereon from the input circuit and output circuit of each of said plurality of amplifier networks, respectively, wherein the connections to any such point are singularly associated with only one of said plurality of amplifiers.

3. An oscillator system comprising three amplifier networks each having an input circuit of high impedance and an output circuit of low impedance and a gain from input circuit to output circuit of less than unity, three pairs of resistive and capacitive elements connected in series to form a loop, means for coupling the input circuits and output circuits of said amplifier networks to said loop such that the input voltage and output voltage of each amplifier network are 180° apart, and a single cathode bias means common to all of said amplifier networks whereby alternating signals in said output circuits are controlled by said resistive and capacitive elements.

4. An oscillator system comprising three amplifier networks having an input circuit of high impedance and an output circuit of low impedance and a gain from input circuit to output circuit of less than unity, three pairs of resistive and capacitive elements connected in series to form a loop, means for coupling the input circuits and output circuits of said amplifier networks to said loop such that the input voltage and output voltage of each amplifier network are 180° apart, a single cathode bias impedance common to all of said amplifier networks, and non-linear means in each amplifier network to maintain the gain thereof at said level whereby oscillatory signals in each of said output circuits are identical and spaced 120° in phase.

5. An oscillator system comprising three amplifier networks each having an input circuit and an output circuit and a gain less than unity, a series loop of impedances comprising three resistive elements and three capacitive elements alternately connected, and at least two links common to said three amplifier networks, the first link comprising a single self-biasing impedance for said amplifier networks for flow of cathode current from said three amplifier networks therethrough, and the second link comprising connections to said loop at diametrically opposed points from the input circuit and output circuit of each of said amplifier networks, respectively, wherein the connections to any such point are singularly associated with a given amplifier.

6. A polyphase oscillator system comprising a plurality of amplifiers each having an input and an output circuit, a like number of pairs of resistive and capacitive elements connected in series to form a loop in which resistive and capacitive elements are alternately connected, means for connecting each said input circuit to a juncture between adjacent resistive and capacitive elements, and means for connecting each said output circuit to a juncture between adjacent resistive and capacitive elements across said loop from said first named juncture, the connections between said input and output circuits and said loop being such that the junctures between resistive and capacitive elements are exclusively connected to a single output or input circuit whereby the oscillation signals at said output circuits are uniform in amplitude and spaced at uniform phase angles.

7. A polyphase oscillator system comprising a plurality of amplifiers each having an input and an output circuit, a like number of pairs of resistive and capacitive elements connected in series to form a loop in which resistive and capacitive elements are alternately connected, means for connecting each said input circuit to a juncture between adjacent resistive and capacitive elements, means for connecting each said output circuit to a juncture between adjacent resistive and capacitive elements across said loop from first named juncture, the connections between said output and input circuits and said loop being such that the junctures between resistive and capacitive elements are exclusively connected to a single output or input circuit, and means in each said amplifier for maintaining the signal at the output circuit less than the signal at the input circuit thereof whereby the signals at said output circuits are uniform in ampliude and spaced in phase at uniform phase angles.

8. A polyphase oscillator system comprising three amplifiers each having an input and an output circuit, three pairs of resistive and capacitive elements connected in series to form a loop in which resistive and capacitive elements are alternately connected, means for connecting each said input circuit to a juncture between adjacent resistive and capacitive elements, and means for connecting each said output circuit to a juncture between adjacent resistive and capacitive elements diametrically across said loop from said first named juncture, the connections between said input and output circuits and said loop being such that the junctures between resistive and capacitive elements are exclusively connected to a single output or input circuit whereby the signals at said output circuits are uniform in amplitude and spaced 120° in phase.

9. A polyphase oscillator comprising an odd number of vacuum tubes each having an anode, control grid and cathode, phase shifting networks interconnecting the anodes of said tubes to form a closed loop and each adapted to produce signals at output points intermediate said anodes which signals are shifted in phase from the signal at an adjacent anode by an angle proportional to the number of said vacuum tubes, and means for connecting each such point to the grid of the vacuum tube diametrically across said loop to form a plurality of subloops to sustain oscillation in said loop.

10. A polyphase oscillator comprising a plurality of vacuum tubes each having an anode, control grid and cathode, phase shifting networks interconnecting the anodes of said tubes to form a closed loop and each adapted to produce signals at output points intermediate said anodes which signals are spaced in phase from the signal at an adjacent anode by an angle proportional to the number of said vacuum tubes, and means for connecting each such point to the grid of the vacuum tube across said loop to form subloops to sustain oscillation in said loop whereby the voltages at said points are spaced in phase an amount equal to said phase angle.

11. In combination, an odd number of vacuum tubes each having an anode, control grid and cathode, phase shifting networks interconnecting the anodes of said tubes to form a closed loop and each adapted to produce signals at output points intermediate said anodes which signals are shifted in phase from the signal at an adjacent anode by an angle proportional to the number of said vacuum tubes, means for connecting each such point to the grid of the vacuum tube diametrically across said loop to form a plurality of subloops to sustain oscillation in said loop, a closed potentiometer, means for connecting each said output point to a point on said potentiometer, the resistances between adjacent points on said potentiometer being substantially equal, and a tap selectively positionable at any point on said potentiometer to detect a voltage having a phase relative to the voltage of one of said output points selectively variable to any phase angle from zero to $2\pi$ radians.

12. An oscillator system comprising three amplifiers each having a cathode follower input stage and a cathode follower output stage and an intermediate amplifier stage, three pairs of resistive and capacitive elements connected in series to form a loop in which resistive and capacitive elements are alternately connected, means for connecting each cathode follower input circuit to a juncture between adjacent resistive and capacitive elements in said loop, means for connecting each cathode follower output circuit to a juncture between adjacent resistive and capacitive elements diametrically across said loop from said first named juncture, the connections between said input and output circuits and said loop being such that the junctures between resistive and capacitive elements are exclusively connected to a single input or output circuit, voltage dividing means in each of said amplifiers for reducing the voltage at the output terminals thereof to a fraction of the input voltage thereof, a common connection between the cathodes of the amplifier stages of each of said amplifiers, and means leading from said common connection to provide an alternating current free self-bias whereby alternating signals in said loop are controlled exclusively by said resistive and capacitive elements.

13. An oscillator system comprising three direct coupled amplifiers each having a cathode follower input stage and a cathode follower output stage and an intermediate amplifier stage, three pairs of resistive and capacitive elements connected in series to form a loop in which resistive and capacitive elements are alternately connected, means for connecting each cathode follower input circuit to a juncture between adjacent resistive and capacitive elements in said loop, means for connecting each cathode follower output circuit to a juncture between adjacent resistive and capacitive elements across said loop from said first named juncture, the connections between said input and output circuits and said loop being such that the junctures between resistive and capacitive elements are exclusively connected to a single input or output circuit, voltage dividing means following each said intermediate amplifier stage for reducing the voltage at the output terminals of each direct coupled amplifier to a fraction of the input voltage thereof, and a single self-bias impedance for the three cathodes of said intermediate amplifier stages to provide a bias free of alternating current components whereby varying signals in said loop are controlled exclusively by said resistive and capacitive elements.

References Cited in the file of this patent

UNITED STATES PATENTS

| | | |
|---|---|---|
| 1,972,535 | Page | Sept. 4, 1934 |
| 2,069,521 | Davis | Feb. 2, 1937 |
| 2,460,790 | Jarvis | Feb. 1, 1949 |

UNITED STATES PATENT OFFICE

CERTIFICATE OF CORRECTION

Patent No. 2,791,694 May 7, 1957

Goethe M. Groenendyke

It is hereby certified that error appears in the printed specification of the above numbered patent requiring correction and that the said Letters Patent should read as corrected below.

Column 5, line 43, for "91 ic" read --91 is--; line 54, for "31a whose output is connected to an isolating network" read --31a whose output is connected to output terminals 31.--; column 8, line 1, for "ampliude" read --amplitude--.

Signed and sealed this 5th day of November 1957.

(SEAL)
Attest:
KARL H. AXLINE

Attesting Officer

ROBERT C. WATSON
Commissioner of Patents